US012661752B2

(12) United States Patent
Oya et al.

(10) Patent No.: US 12,661,752 B2
(45) Date of Patent: Jun. 23, 2026

(54) MACHINE TOOL AND DISPLAY CONTROL DEVICE

(71) Applicant: DMG MORI CO., LTD., Nara (JP)

(72) Inventors: Megumi Oya, Hokkaido (JP); Junjiro Enomoto, Hokkaido (JP); Shimpei Koda, Hokkaido (JP); Toshitaka Nagano, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 265 days.

(21) Appl. No.: 18/281,252

(22) PCT Filed: Jun. 16, 2022

(86) PCT No.: PCT/JP2022/024082
§ 371 (c)(1),
(2) Date: Sep. 8, 2023

(87) PCT Pub. No.: WO2023/276693
PCT Pub. Date: Jan. 5, 2023

(65) Prior Publication Data
US 2024/0139896 A1 May 2, 2024

(30) Foreign Application Priority Data

Jun. 28, 2021 (JP) ................................. 2021-106227

(51) Int. Cl.
*B23Q 17/09* (2006.01)
*G05B 19/404* (2006.01)

(52) U.S. Cl.
CPC ....... *B23Q 17/0976* (2013.01); *G05B 19/404* (2013.01); *G05B 2219/36089* (2013.01);
(Continued)

(58) Field of Classification Search
None
See application file for complete search history.

(56) References Cited

U.S. PATENT DOCUMENTS

| | | | | |
|---|---|---|---|---|
| 12,050,450 B2 * | 7/2024 | Yamamoto | ......... | G05B 19/4063 |
| 2002/0146296 A1 * | 10/2002 | Schmitz | ............. | B23Q 17/0976 |
| | | | | 409/141 |

(Continued)

FOREIGN PATENT DOCUMENTS

| | | |
|---|---|---|
| JP | 2012-088783 A | 5/2012 |
| JP | 2012-088967 A | 5/2012 |
| JP | 2018-176296 A | 11/2018 |

*Primary Examiner* — Ariel Mercado-Vargas
(74) *Attorney, Agent, or Firm* — IP Business Solutions, LLC

(57) ABSTRACT

A display control device includes a calculation unit for calculating a first rotating speed on the basis of a vibration level detected by a vibration detection unit when the vibration level has exceeded a predetermined value, a change receiving unit for receiving a change instruction for changing a second rotating speed that is a rotating speed when the vibration level has exceeded the predetermined value to the first rotating speed, and a display control unit for performing control to display, on an operation screen, the first rotating speed, the second rotating speed, and a ratio display unit indicating a change ratio to a third rotating speed specified by a machining program, and performing control to display the first rotating speed at a position in the ratio display unit corresponding to a change ratio of the first rotating speed to the third rotating speed.

4 Claims, 19 Drawing Sheets

(52) U.S. Cl.
CPC .............. *G05B 2219/37434* (2013.01); *G05B 2219/41256* (2013.01)

(56)                     References Cited

U.S. PATENT DOCUMENTS

| | | | |
|---|---|---|---|
| 2011/0135415 A1 | 6/2011 | Hamaguchi et al. | |
| 2012/0093598 A1 | 4/2012 | Ando et al. | |
| 2016/0288285 A1* | 10/2016 | Piner .................. | B23Q 17/0976 |
| 2018/0029185 A1* | 2/2018 | Tanaka ................ | G01M 13/028 |
| 2019/0391558 A1* | 12/2019 | Kawai .................. | G05B 19/404 |
| 2020/0225638 A1* | 7/2020 | Takahei ............... | G05B 19/404 |
| 2020/0278659 A1* | 9/2020 | Liu .................... | G05B 19/4155 |
| 2021/0299901 A1* | 9/2021 | Xu ......................... | B26D 7/086 |
| 2021/0311460 A1* | 10/2021 | Sagasaki ................ | G05B 19/19 |

* cited by examiner 184          186

FIG.19A

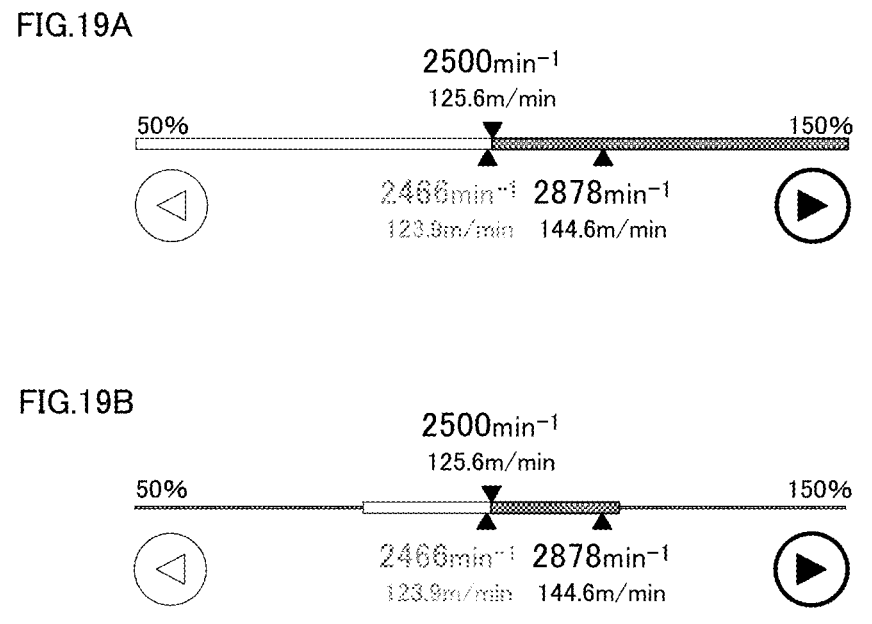

2500min⁻¹
125.6m/min

50%                                                    150%

2466min⁻¹   2878min⁻¹
123.9m/min   144.6m/min

FIG.19B

2500min⁻¹
125.6m/min

50%                                                    150%

2466min⁻¹   2878min⁻¹
123.9m/min   144.6m/min

MACHINE TOOL AND DISPLAY CONTROL DEVICE

TECHNICAL FIELD

The present invention relates to a display control technology for supporting convergence of chatter vibration occurring in machine tools.

BACKGROUND ART

Chatter vibration occurring in machine tools leads to quality deterioration of a machined surface of a workpiece. Therefore, it is important to suppress occurrence of chatter vibration. There are a variety of causes of occurrence of chatter vibration. A vibration source may be a tool or a workpiece. An operator takes an action on the basis of one's own experience to find and remove the cause in many cases. For example, the operator listens to the vibration sound and observes the machined surface of the workpiece to presume the cause of occurrence of chatter vibration, and adjusts a spindle rotating speed, a spindle feed rate, or a depth or width of cut of the tool, for example. When the chatter vibration does not converge after the above adjustment, the operator attempts to change a method of fixing the workpiece or to change the tool. The countermeasures are selected on the basis of one's own experience and knowledge.

There are several factors of chatter vibration. Major factors are regenerative chatter resulting from a change in thickness of cut of the tool caused by undulations of the machined surface due to vibration and forced chatter caused by resonance based on a natural frequency. In one known method for suppressing regenerative chatter, a spindle rotating speed is adjusted to make an integer component of a chatter frequency at a tool passing frequency coincident with a current order, thereby causing the spindle rotating speed to fall within a stability region (see Patent Literature 1).

Meanwhile, in one known method for suppressing forced chatter, the spindle rotating speed is adjusted to make the integer component of the chatter frequency at the tool passing frequency different from the current order, thereby suppressing the chatter vibration. In any case, in order to avoid chatter vibration, the operator has to know a current spindle rotating speed and the spindle rotating speed calculated by either one of the above-described methods (a recommendation value) and determine how to adjust the spindle rotating speed.

A display control technology has been proposed for supporting this determination to be made by the operator, which displays a stability limit diagram and a vibration distribution diagram on an operation screen side by side and superimposes the current spindle rotating speed on these diagrams, for example (see Patent Literature 2). Further, another display control technology has been proposed, which displays a graph representing vibration information on an operation screen and plots a marker that allows the type of chatter vibration to be visually identified (see Patent Literature 3). The operator can determine a speed to which the spindle rotating speed is to be changed in order to suppress the chatter vibration, by checking the operation screen.

CITATION LIST

Patent Literature

PTL 1: JP 2018-176296 A
PTL 2: JP 2012-88783 A
PTL 3: JP 2012-88967 A

SUMMARY OF INVENTION

Technical Problem

According to the methods described in Patent Literatures 2 and 3, the operator can estimate the speed to which the spindle rotating speed is to be changed, while knowing the current spindle rotating speed. However, since the stability region itself changes from moment to moment, it is not easy to make determination while following the change. Even when the speed to which the spindle rotating speed is to be changed can be identified, it is difficult to immediately ascertain how much the spindle rotating speed changes from the current spindle rotating speed. Therefore, there is a concern that the operator hesitates to perform a change operation because of a concern about a sudden change of a control state, and has difficulty in taking a quick response.

Solution to Problem

An embodiment of the present invention is a display control device for controlling display of an operating state of a machine tool including (i) an attachment portion to which a tool is attachable, (ii) a numerical control unit for controlling rotation of the tool in accordance with a machining program and (iii) a vibration detection unit for detecting vibration of the tool. The display control device includes: a calculation unit for calculating a first rotating speed on a basis of a vibration level detected by the vibration detection unit when the vibration level has exceeded a predetermined value; a change receiving unit for receiving a change instruction for changing a second rotating speed to the first rotating speed, the second rotating speed being a rotating speed when the vibration level has exceeded the predetermined value; and a display control unit for (i) performing control to display, on an operation screen, the first rotating speed, the second rotating speed, and a ratio display unit indicating a change ratio to a third rotating speed specified by the machining program, and (ii) performing control to display the first rotating speed at a position in the ratio display unit corresponding to a change ratio of the first rotating speed to the third rotating speed. When the change receiving unit has received a change, the numerical control unit performs control to change a control command value of a rotating speed of the tool to the first rotating speed.

Another embodiment of the present invention is a machine tool. The machine tool includes: an attachment portion to which a tool is attachable; a numerical control unit for controlling rotation of the tool in accordance with a machining program; a vibration detection unit for detecting vibration of the tool; a calculation unit for calculating a first rotating speed on a basis of a vibration level detected by the vibration detection unit when the vibration level has exceeded a predetermined value; a change receiving unit for receiving a change instruction for changing a second rotating speed to the first rotating speed, the second rotating speed being a rotating speed when the vibration level has exceeded the predetermined value; and a display control unit for performing control to display, on an operation screen, the first rotating speed, the second rotating speed, and a ratio display unit indicating a change ratio to a third rotating speed specified by the machining program, and performing control to display the first rotating speed at a position in the ratio display unit corresponding to a change ratio of the first rotating speed to the third rotating speed. When the change receiving unit has received a change, the numerical control unit performs control to change a control command value of a rotating speed of the tool to the first rotating speed.

Advantageous Effects of Invention

According to the present invention, it is possible to provide easy-to-use display for an operator when an operation for suppressing chatter vibration in a machine tool is prompted.

BRIEF DESCRIPTION OF DRAWINGS

FIG. 9 is a flowchart of a spindle-rotating-speed adjustment process at S22 in

FIG. 7.

FIG. 19A is a diagram illustrating a main part of a tuning screen according to a modification.

FIG. 19B is a diagram illustrating a main part of a tuning screen according to a modification.

DESCRIPTION OF EMBODIMENTS

An embodiment of the present invention will now be described below with reference to the drawings.

Figure 1:
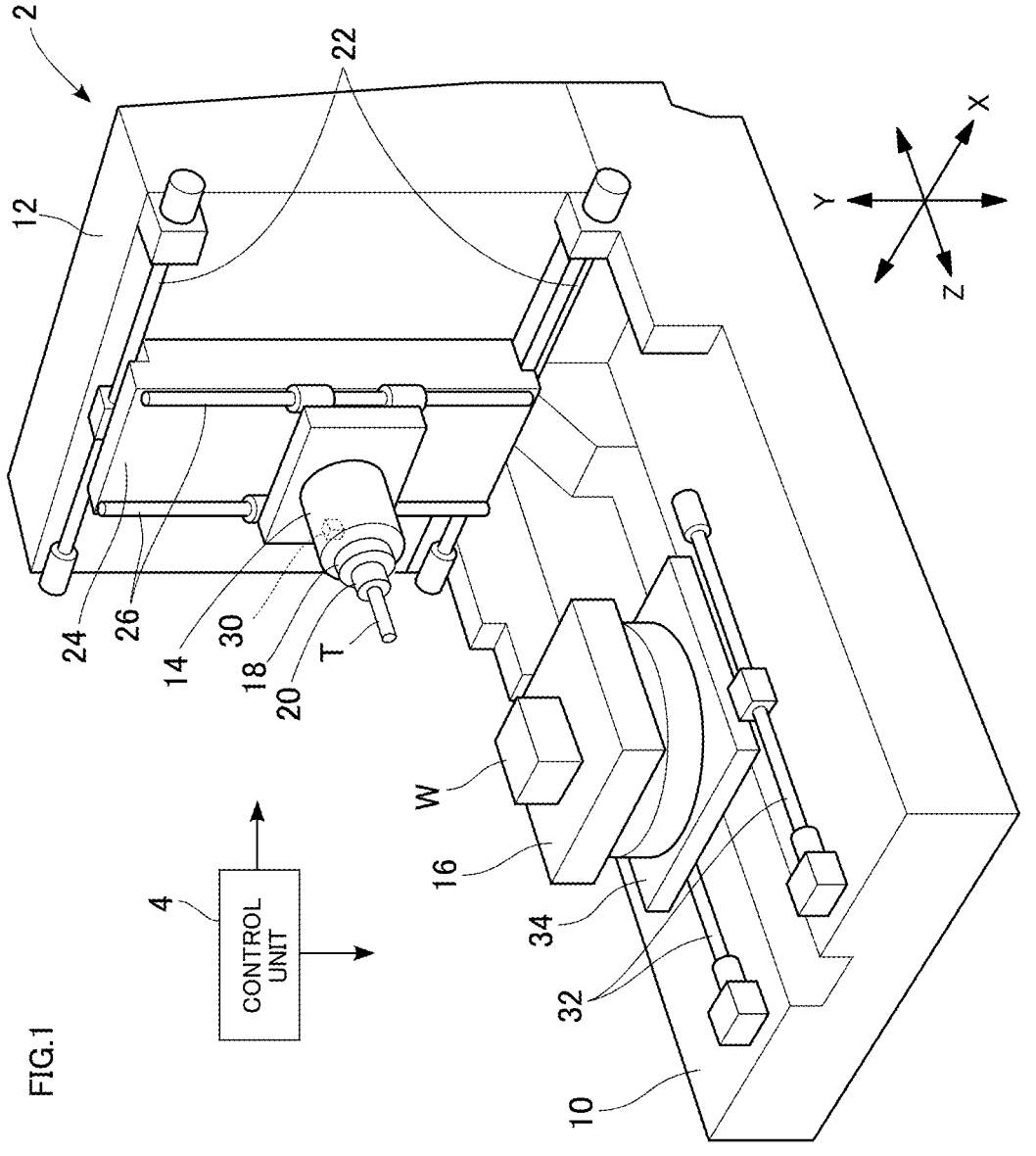
FIG. 1 is a perspective view illustrating a schematic configuration of a machine tool according to an embodiment.

FIG. 1 is a perspective view illustrating a schematic configuration of a machine tool according to an embodiment. Here, the left-right direction, the up-down direction, and the front-back direction when a machine tool 1 is viewed from the front are referred to as an X-axis direction, a Y-axis direction, and a Z-axis direction, respectively.

The machine tool 1 is a horizontal machining center and includes machining equipment 2 and a control unit 4. A housing (not illustrated) is provided to cover the machining equipment 2. A console is provided on a side surface of the housing. The console includes a touch panel (described later) that can be operated by an operator.

The machining equipment 2 includes a bed 10, a column 12 provided to stand on the bed 10, a spindle head 14 movably provided on the front surface side of the column 12, and a table 16 movably provided on the bed 10. The spindle head 14 has an axis in the Z-axis direction and supports a spindle 18 to allow the spindle 18 to rotate around the axis. The spindle head 14 is provided with a spindle motor for rotatively driving the spindle 18. The spindle 18 functions as an "attachment portion" to which a tool T held by a tool holder 20 can be coaxially attached. A workpiece W is fixed onto the table 16 via a jig (not illustrated).

Guiderails 22 are provided on the front surface of the column 12 and a saddle 24 is supported by the guiderails 22 to be movable in the X-axis direction. The saddle 24 is provided with guiderails 26 on its front surface which support the spindle head 14 in such a manner that the spindle head 14 can move in the Y-axis direction. Movement of the saddle 24 and the spindle head 14 is realized by a feed mechanism and a servo motor driving the feed mechanism (both not illustrated). The feed mechanism is, for example, a screw feed mechanism using a ball screw. The saddle 24 and the spindle head 14 are driven to move the spindle 18 in the X and Y-axis directions. The spindle head 14 has an acceleration sensor (accelerometer) 30 incorporated therein. The acceleration sensor 30 is used for detecting chatter vibration of the tool T and will be described in detail later.

Meanwhile, guiderails 32 are provided on the top surface of the bed 10. A saddle 34 is supported by the guiderails 32 to be movable in the Z-axis direction. The table 16 is fixed on the saddle 34. Movement of the saddle 34 is realized by a feed mechanism and a servo motor driving the feed mechanism (both not illustrated). The feed mechanism is, for example, a screw feed mechanism using a ball screw. The saddle 34 is driven to move the workpiece W in the Z-axis direction. That is, the configuration described above can adjust relative positions of the workpiece W and the tool T to each other three-dimensionally.

Figure 2:
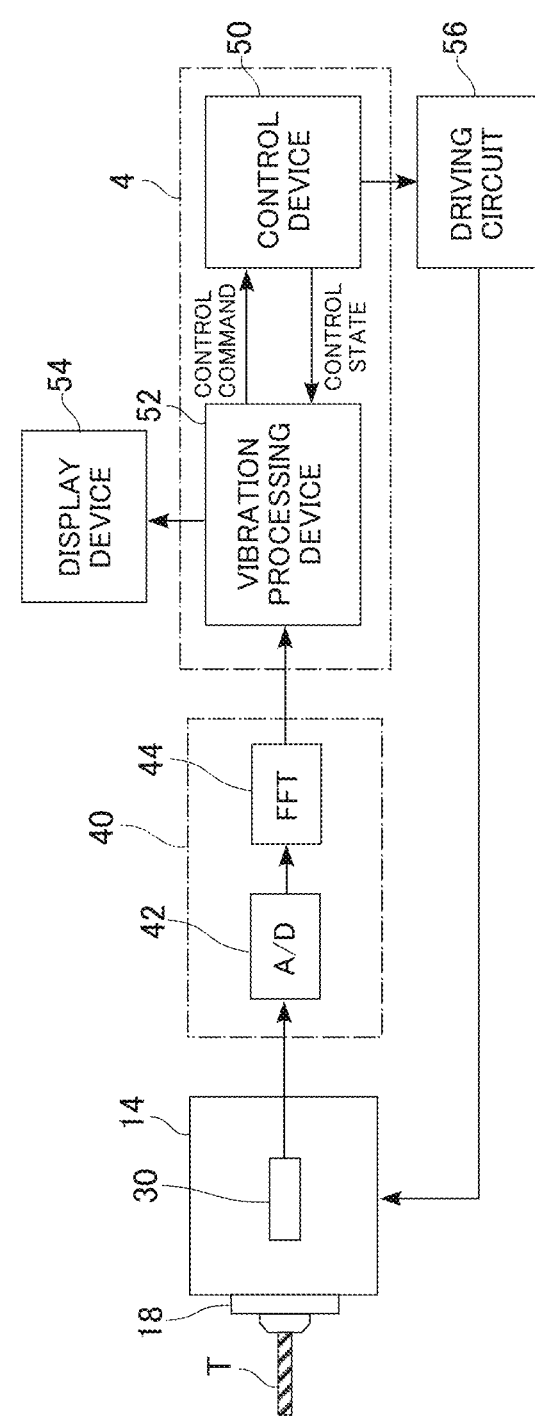
FIG. 2 is a diagram schematically illustrating an electrical configuration of function units involved in detection of chatter vibration.

FIG. 2 is a diagram schematically illustrating an electrical configuration of function units involved in detection of chatter vibration.

The spindle head 14 has the acceleration sensor 30 incorporated therein as described above. The acceleration sensor 30 detects vibration occurring in the tool T during machining of the workpiece W and outputs a signal depending on the vibration. The acceleration detected by the acceleration sensor 30 (in more detail, the electrical signal representing the acceleration) is input to a signal processing device 40.

The signal processing device 40 is configured by an A/D converter 42 and a frequency analyzing device 44 that are mounted on a dedicated board. For the signal output from the acceleration sensor 30, AD conversion is performed by the A/D converter 42, and FFT (fast Fourier transform) is performed by the frequency analyzing device 44. The resultant information is output to the control unit 4.

The control unit 4 includes a control device 50 and a vibration processing device 52. A display device 54 is connected to the control unit 4. The display device 54 is a touch panel provided on a console and displays a screen indicating a control state of the machine tool 1 and an operation screen to be operated by an operator.

The vibration processing device 52 receives information indicating a control state from the control device 50 and outputs a control instruction according to input of an operation by the operator to the control device 50. The vibration processing device 52 performs predetermined processing related to chatter vibration on the basis of the signal received from the signal processing device 40 and the signal received from the control device 50.

The vibration processing device 52 causes a screen (a status screen) indicating a vibration state of the spindle 18 (that is, a vibration state of the tool T) to be displayed on the basis of the signal input from the signal processing device 40 and determines whether chatter vibration has occurred. Upon determining that chatter vibration has occurred, the vibration processing device 52 causes an operation screen (a tuning screen) for causing the chatter vibration to converge to be displayed. These processes will be described in detail later.

The control device 50 controls an actuator, such as a motor, in accordance with a machining program (an NC program) manually or automatically created. When turning is performed for the workpiece W, the control device 50 drives a servo motor via a driving circuit 56 to feed-drive the spindle head 14. The control device 50 also drives a spindle motor via the driving circuit 56 to rotate the spindle 18.

Figure 3:
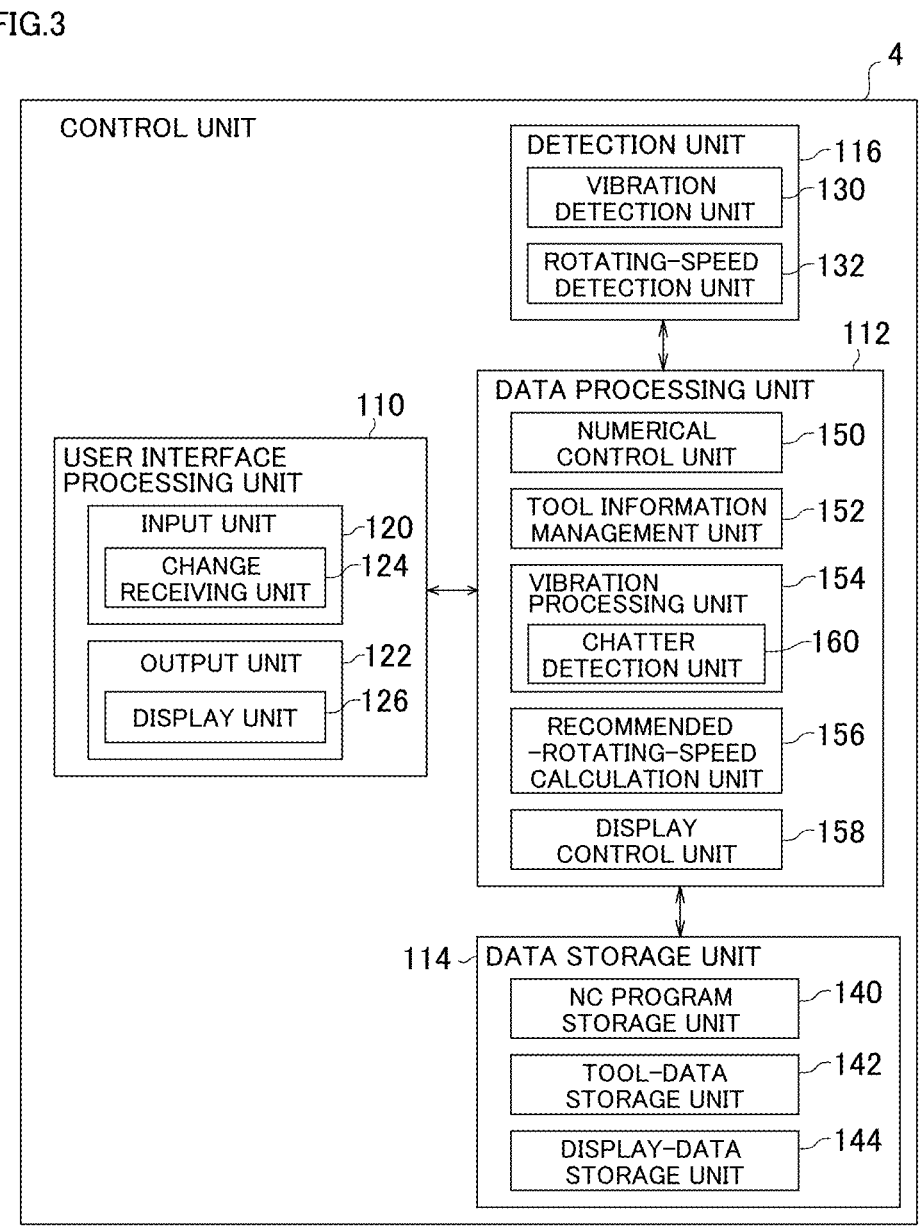
FIG. 3 is a functional block diagram of a control unit.

FIG. 3 is a functional block diagram of the control unit 4.

The components of the control unit 4 are implemented by hardware including computing units such as central processing units (CPUs) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks to be described below do not refer to configurations in units of hardware but to blocks in units of functions.

The control unit 4 includes a user interface processing unit 110, a data processing unit 112, a data storage unit 114, and a detection unit 116. The user interface processing unit 110 performs processes related to user interfaces such as receiving operations input by an operator, displaying images, and outputting audio. The data processing unit 112 performs various processes on the basis of data obtained by the user interface processing unit 110, information detected by the detection unit 116, and data stored in the data storage unit 114. The data processing unit 112 also functions as an interface of the user interface processing unit 110, the detection unit 116, and the data storage unit 114. The data storage unit 114 stores various programs and set data therein.

The user interface processing unit 110 includes an input unit 120 and an output unit 122. The input unit 120 receives input made by the operator via a touch panel or a hardware device such as a handle. The input unit 120 includes a change receiving unit 124. The change receiving unit 124 receives a change instruction by the operator, for example, an instruction to change a rotating speed or a feed speed of the spindle 18.

The output unit 122 provides the operator with various kinds of information by image display or audio output. The output unit 122 includes a display unit 126. The display unit 126 may cause a panel (a keyboard and a machine operation panel) to be displayed as an operation screen on the display device 54. The display unit 126 displays a status screen indicating a state (a control state and a vibration state) of the spindle 18 and, when chatter vibration has occurred, displays the above-described tuning screen (described later in detail).

The detection unit 116 includes a vibration detection unit 130 and a rotating-speed detection unit 132. The vibration detection unit 130 detects vibration of the spindle 18 (that is, vibration of the tool T) on the basis of a sensor output from the acceleration sensor 30 and acquires information output from the signal processing device 40. The rotating-speed detection unit 132 detects the rotating speed of the spindle 18 (that is, the rotating speed of the tool T) on the basis of a sensor output of a rotary encoder (not illustrated) attached to the spindle 18.

The data storage unit 114 includes an NC program storage unit 140, a tool-data storage unit 142, and a display-data storage unit 144. The NC program storage unit 140 stores a machining program (an NC program) therein. The tool-data storage unit 142 stores therein information on the tool T to be used in the machine tool 1 (tool information) in association with a tool ID. The tool information includes, for example, a tool type, a tool diameter, and the number of cutting edges. A range in which a spindle rotating speed can be adjusted by the vibration processing device 52 (hereinafter, an "adjustable range") is also associated with the tool information. The display-data storage unit 144 stores therein data of screens to be displayed by the display unit 126 and data of various images including soft keys, a dialog box, and the like to be displayed on the screens.

The data processing unit 112 includes a numerical control unit 150, a tool information management unit 152, a vibration processing unit 154, a recommended-rotating-speed calculation unit 156, and a display control unit 158. The numerical control unit 150 includes the function of the control device 50. The numerical control unit 150 controls the machining equipment 2 on the basis of a command input from the input unit 120 in accordance with a machining program stored in the data storage unit 114.

The numerical control unit 150 also transmits information indicating a current state of control by the control device 50 (control information) to the vibration processing unit 154 sequentially. The numerical control unit 150 transmits, for example, a control command value of a spindle rotating speed (hereinafter, also a "control-command spindle rotating speed").

The tool information management unit 152 manages information on the tool T (tool information) stored in the tool-data storage unit 142 in association with a tool ID.

The vibration processing unit 154 includes a chatter detection unit 160 as the function of the vibration processing device 52. The frequency analyzing device 44 described above receives a signal continuously output from the acceleration sensor 30 and analyzes the signal by Fourier analysis (frequency analysis) at a predetermined sampling interval, thereby calculating a frequency of vibration occurring in the tool T (a "vibration frequency") and the magnitude of the vibration (also referred to as a "vibration level"). The chatter detection unit 160 acquires information on the vibration level and the vibration frequency and, when the vibration level has exceeded a predetermined threshold, determines that chatter vibration has occurred. A control-command spindle rotating speed when the vibration level has exceeded the threshold corresponds to a "second rotating speed".

Although a configuration example in which the frequency analyzing device 44 is provided in the signal processing device 40 (see FIG. 2) to be separate from the control unit 4 has been described in the present embodiment, the function of the frequency analyzing device 44 may be included in the vibration processing unit 154 as a "frequency analysis unit" in a modification. Further, the signal processing device 40 may be included in the control unit 4 as a part thereof.

When chatter vibration has occurred, the recommended-rotating-speed calculation unit 156 calculates a preferable speed to which the spindle rotating speed is to be changed in order to cause the chatter vibration to converge (also referred to as a "recommended rotating speed"). The recommended rotating speed corresponds to a "first rotating speed" and can be calculated by, for example, a method described in JP 2018-176296 A.

Specifically, when detected chatter vibration is regenerative chatter, a recommended rotating speed SS (a recommendation value) can be calculated by the following Expression (1) on the basis of a vibration frequency ω0 (a chatter frequency) at that time and the number n of cutting edges of the tool T.

$$SS=(60 \times \omega 0)/(n \times k) \tag{1}$$

where k is a given integer equal to or greater than 1.

The recommended rotating speed SS is a rotating speed corresponding to the k-th order stability pocket in a stability limit diagram. Chatter vibration may be able to be eliminated by adjusting the spindle rotating speed to the recommended rotating speed SS. When the recommended rotating speed SS that is obtained by Expression (1) described above when k is set to, for example, 2 with respect to the spindle rotating speed S0 at which the chatter vibration has occurred is within a stability region, the chatter vibration can be eliminated by changing the spindle rotating speed from S0 to SS.

The number n of cutting edges of the tool T can be acquired on the basis of the tool ID of the tool T that is currently being used. The tool information management unit 152 refers to the tool-data storage unit 142 on the basis of that tool ID and acquires the number n of cutting edges. The recommended-rotating-speed calculation unit 156 calculates a first recommendation value higher than a current control-command spindle rotating speed and a second recommendation value lower than the current control-command spindle rotating speed as recommended rotating speeds to be presented to an operator.

The display control unit 158 controls display by the display unit 126. The display control unit 158 causes the display unit 126 to display a screen indicating a state of control by the control device 50 (a status screen and the like) and a screen for monitoring occurrence of chatter vibration (a tuning screen and the like).

The vibration processing unit 154, the recommended-rotating-speed calculation unit 156, the display control unit 158, the change receiving unit 124, and the display unit 126 serve as a "display control device" that controls display of an operating state of the machine tool 1.

Next, processing involved in detecting occurrence of chatter vibration and suppressing the chatter vibration is specifically described.

Figure 4:
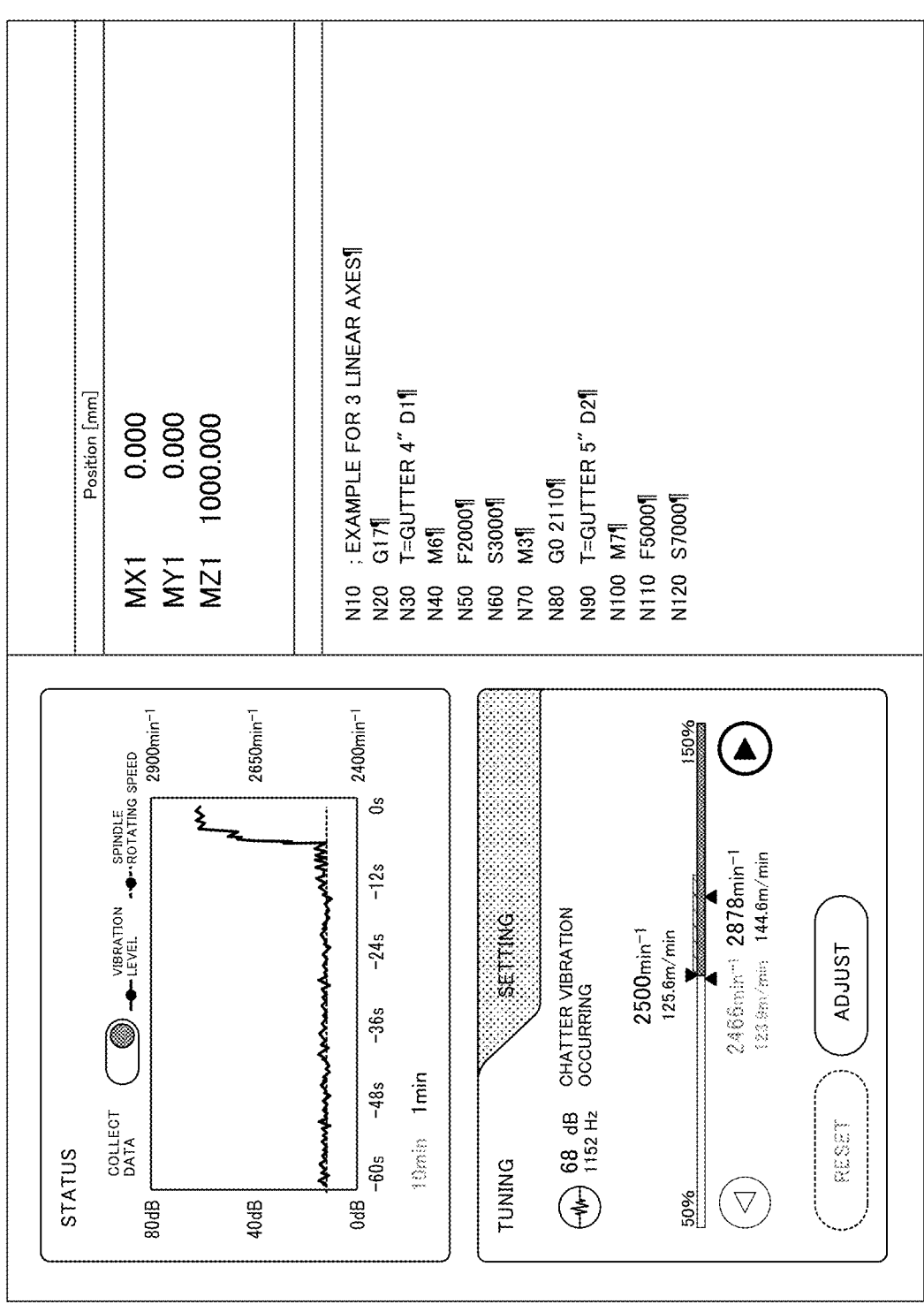
FIG. 4 is a diagram illustrating a management screen for managing a state of control by a control device.

FIG. 4 is a diagram illustrating a management screen for managing a state of control by the control device 50.

A running NC program is displayed in a right region on this management screen. A status screen is displayed in an upper left region. A tuning screen is displayed in a lower left region. These displays use data stored in the display-data storage unit 144.

Figure 5:
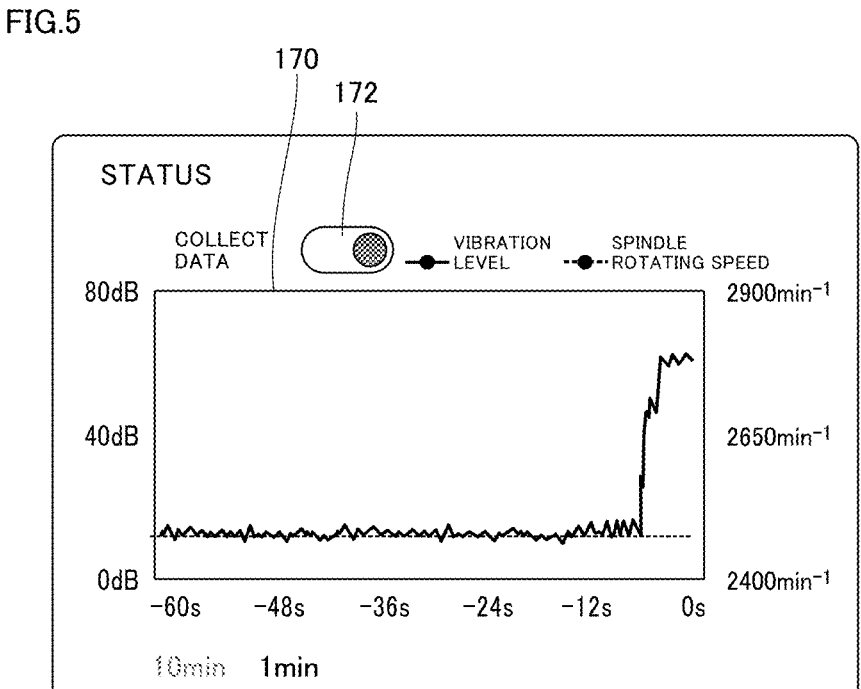
FIG. 5 is a diagram illustrating a status screen.

FIG. 5 is a diagram illustrating a status screen.

A sampling screen 170 is displayed at the center of the status screen, in which the horizontal axis represents elapsed time and the vertical axis represents a vibration level and a spindle rotating speed. The sampling screen 170 is a real-time chart that displays a change in the vibration level and a change in the spindle rotating speed in real time. A solid line represents a change in a vibration level (dB), and a dotted line represents a change in a control command value (min⁻¹) of the spindle rotating speed.

This status screen is also an operation screen having a touch panel function and allows selection of either a pattern in which the scale of the horizontal axis in the sampling screen 170 is up to 10 min or a pattern in which that scale is up to 1 min (60 s). The latter pattern has been selected in the illustrated example. A current time is indicated by "0 s" at the right end of the screen. A previous sampling history is continuously displayed on the left side. The sampling screen 170 is displayed in real time by turning on a collect data button 172 at an upper left position on the screen.

Figure 6:
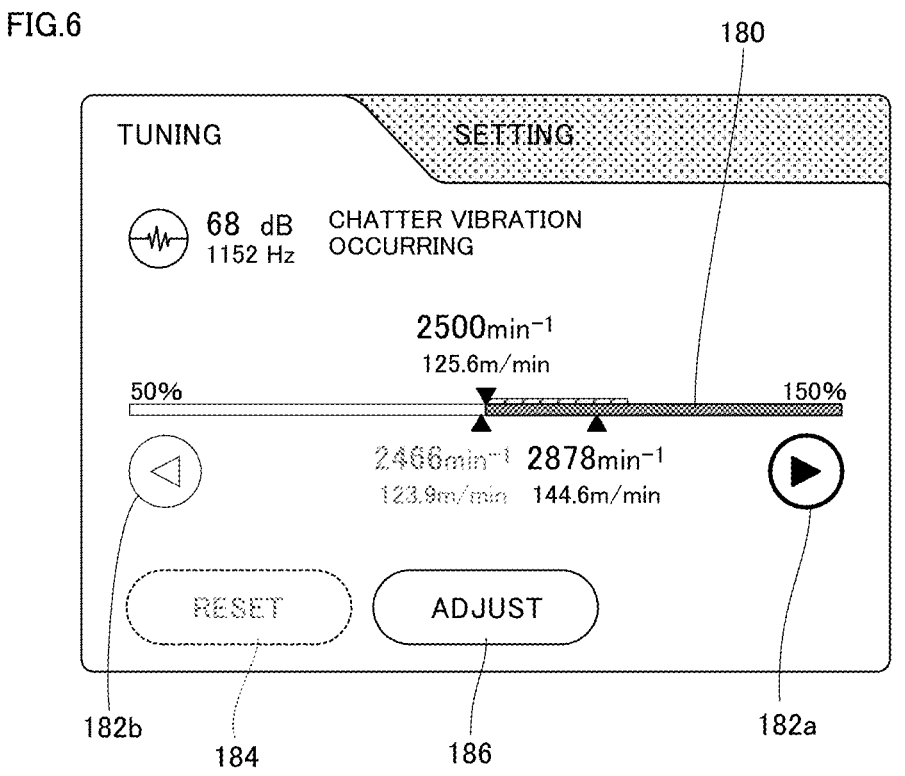
FIG. 6 is a diagram illustrating a tuning screen.

FIG. 6 is a diagram illustrating a tuning screen.

An override bar 180 for indicating a spindle rotating speed is displayed in a central region on the tuning screen. The override bar 180 is a scale object (an object having a scale function) extending to the left and right on the screen. The center of the override bar 180 indicates a position at which a program-command spindle rotating speed is 100%. Here, the "program-command spindle rotating speed" is a spindle rotating speed specified by a machining program and corresponds to a "third rotating speed". The program-command spindle rotating speed does not change until a new value is commanded on the program. A current control-command spindle rotating speed (2500 min⁻¹ in the illustrated example) is displayed above the override bar 180. The control-command spindle rotating speed is a spindle rotating speed commanded by a PLC.

At start of the tuning screen, the control-command spindle rotating speed is displayed above the center of the override bar 180 because the program-command spindle rotating speed and the control-command spindle rotating speed are equal to each other. When the spindle rotating speed is changed by the vibration processing device 52, the display position of the control-command spindle rotating speed is changed depending on a ratio of the change. While normal control is executed, an actual spindle rotating speed detected by the above-described rotary encoder (also referred to as an "actual spindle rotating speed") is substantially coincident with the control-command spindle rotating speed.

The right end of the override bar 180 is a position indicating 150% (that is, +50%) of the program-command spindle rotating speed, and the left end thereof is a position indicating 50% (that is, −50%) of the program-command spindle rotating speed. That is, the override bar 180 corresponds to a "ratio display unit" that indicates a ratio of a change in the control-command spindle rotating speed to the current program-command spindle rotating speed.

A vibration level and a peak frequency currently detected are displayed in an upper region on the tuning screen. The "peak frequency" means a vibration frequency at which the vibration level is the highest currently. A vibration level of 68 (dB) and a peak frequency of 1152 (Hz) are displayed in the illustrated example. Further, since chatter vibration has been determined as having occurred from this vibration level, a character string "chatter vibration occurs" notifying the occurrence is displayed.

When chatter vibration has been detected, the recommended-rotating-speed calculation unit 156 calculates two recommended rotating speeds for causing the chatter vibration to converge (the first recommendation value and the second recommendation value), as described above. The display control unit 158 causes the two recommendation values thus calculated to be displayed on the tuning screen. In the illustrated example, "2878 min⁻¹" and "2466 min⁻¹"

are displayed as the first recommendation value and the second recommendation value, respectively, below the scale along the scale.

Symbol ▼ indicating a position of the control-command spindle rotating speed and its numerical value (2500 min⁻¹) are displayed at a position corresponding to a ratio of the control-command spindle rotating speed to the program-command spindle rotating speed in the override bar 180. Symbol ▲ indicating a position of the first recommendation value and its numerical value (2878 min⁻¹) are displayed at a position corresponding to a ratio of the first recommendation value to the program-command spindle rotating speed in the override bar 180. Similarly, symbol ▲ indicating a position of the second recommendation value and its numerical value (2466 min⁻¹) are displayed at a position corresponding to a ratio of the second recommendation value to the program-command spindle rotating speed in the override bar 180.

A numerical value (m/min) under each spindle rotating speed represents the peripheral speed (m/min) of a tool and is calculated by the following Expression (2).

$$\text{Peripheral speed [m/min]=spindle rotating speed} \\ \text{[min}^{-1}\text{]}\times\pi\times\text{(tool diameter [mm]/1000)} \tag{2}$$

This "peripheral speed" is an index of a tool load.

However, since one of the first and second recommendation values is set to be selectable by presetting performed by the operator as described later, the non-selectable recommendation value is grayed out. The presetting of the recommendation value can be performed by switching select buttons 182a and 182b that will be described later. The detailed description of the switching is omitted.

The tuning screen is an operation screen having a touch panel function, on which a plurality of kinds of buttons selectable by the operator are displayed. The select buttons 182a and 182b for selecting a method of setting the recommendation values are displayed a little below the right and left ends of the override bar 180, respectively. A reset button 184 and an adjust button 186 are displayed in a lower region on the tuning screen. The adjust button 186 serves as an "instruction input unit" that receives a speed change command for the spindle rotating speed. The reset button 184 serves as a "reset command input unit" that receives a command to reset the control-command spindle rotating speed to the program-command spindle rotating speed.

However, for each of the reset button 184 and the adjust button 186, determination whether to display that button is made in the course of the processing by the vibration processing unit 154. When the button is selectable, it is displayed normally (also referred to as "displayed as being active"). When the button is non-selectable, it is grayed out. The adjust button 186 is displayed as being active when the selected recommendation value is within a preset adjustable range.

In the illustrated example, the first recommendation value is selected in the presetting, and the select button 182a is displayed as being active. Since chatter vibration has occurred in this state, the second recommendation value is grayed out. In addition, since the selected first recommendation value is within the adjustable range, the adjust button 186 is displayed as being active. The operator can give an instruction to change the control-command spindle rotating speed (2500 min') to the recommended rotating speed (the first recommendation value: 2878 min') by tapping (selecting) the adjust button 186 in this state.

The adjustable range of the spindle rotating speed is set to a range from 50% to 150% (that is, within ±50%) of the program-command spindle rotating speed, as illustrated in FIG. 5A in the present embodiment. This setting prevents a rapid change of the rotating speed (the control state) of the spindle 18 which is unexpected for the operator.

The vibration processing unit 154 outputs an instruction to change the spindle rotating speed to the numerical control unit 150 in response to an input made by the operator. In response to this change instruction, the numerical control unit 150 changes a control command value of the spindle rotating speed (that is, the control-command spindle rotating speed).

Next, specific processing for suppressing chatter vibration is described.

Figure 7:
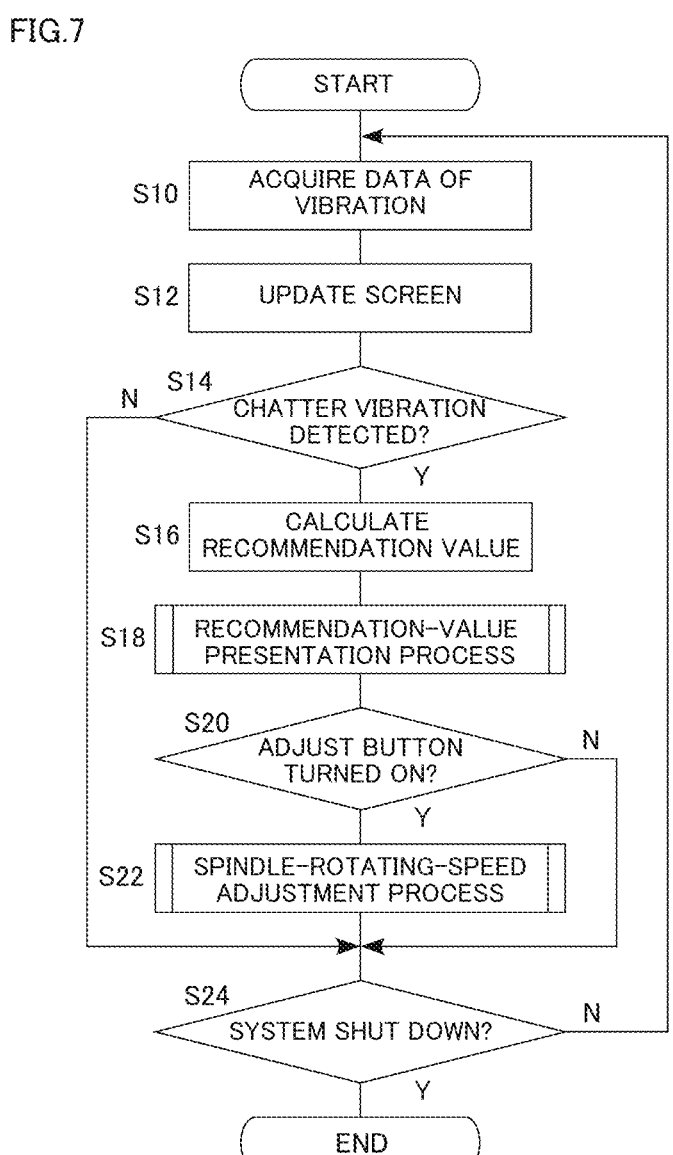
FIG. 7 is a flowchart of a vibration control process.
Figure 8:
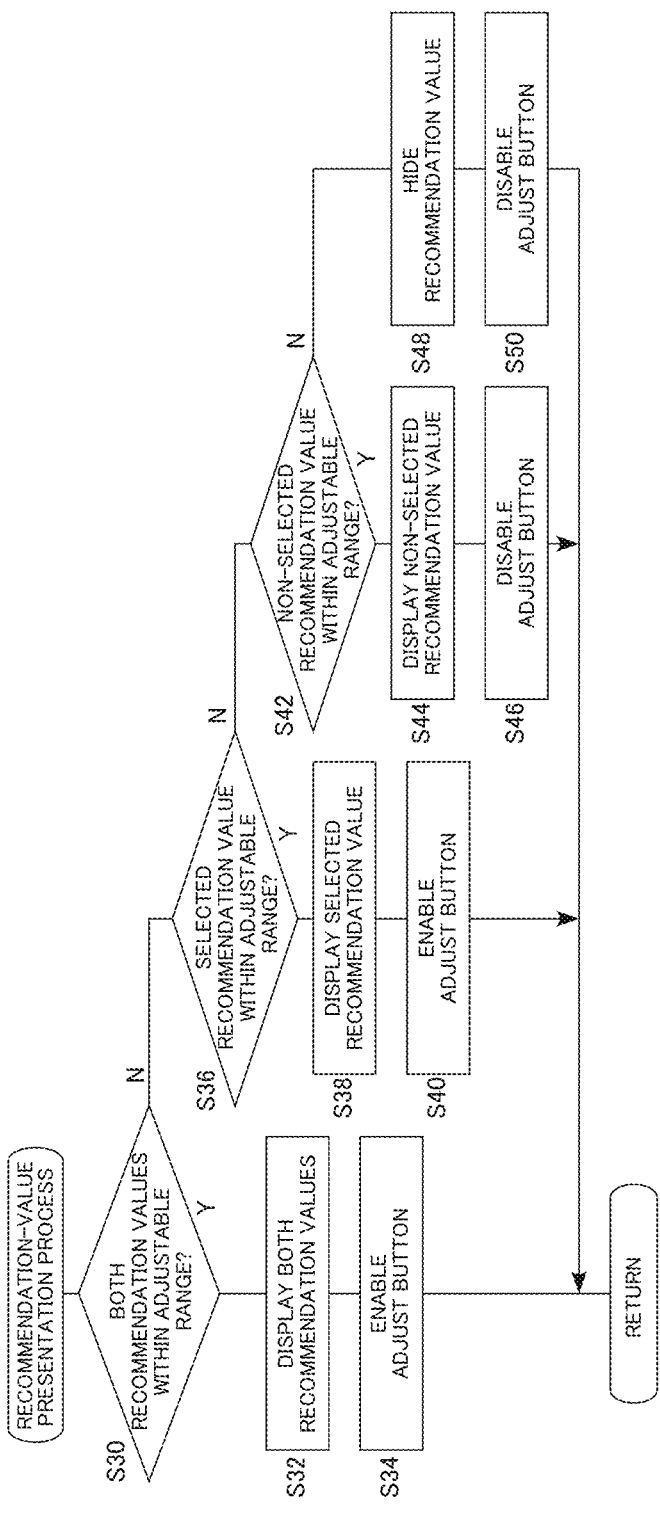
FIG. 8 is a flowchart of a recommendation-value presentation process at S18 in FIG. 7.
Figure 9:
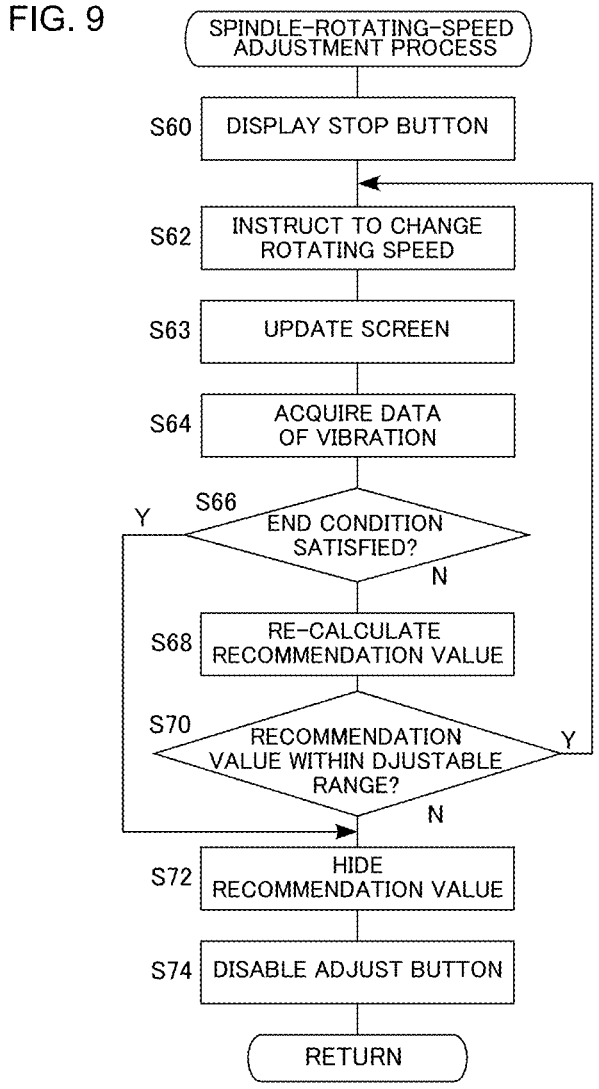

FIG. 7 is a flowchart of a vibration control process. FIG. 8 is a flowchart of a recommendation-value presentation process at S18 in FIG. 7. FIG. 9 is a flowchart of a spindle-rotating-speed adjustment process at S22 in FIG. 7. FIGS. 10 to 18 are diagrams illustrating status screens and tuning screens displayed in the course of respective processes. Descriptions are provided below on the basis of FIG. 7 to FIG. 9 while referring to FIG. 10 to FIG. 18 appropriately.

As illustrated in FIG. 7, in the vibration control process, the vibration processing unit 154 acquires data of vibration of the spindle 18 via the detection unit 116 (S10). The display control unit 158 updates a status screen and a tuning screen on the basis of the vibration data (S12).

Figure 10:
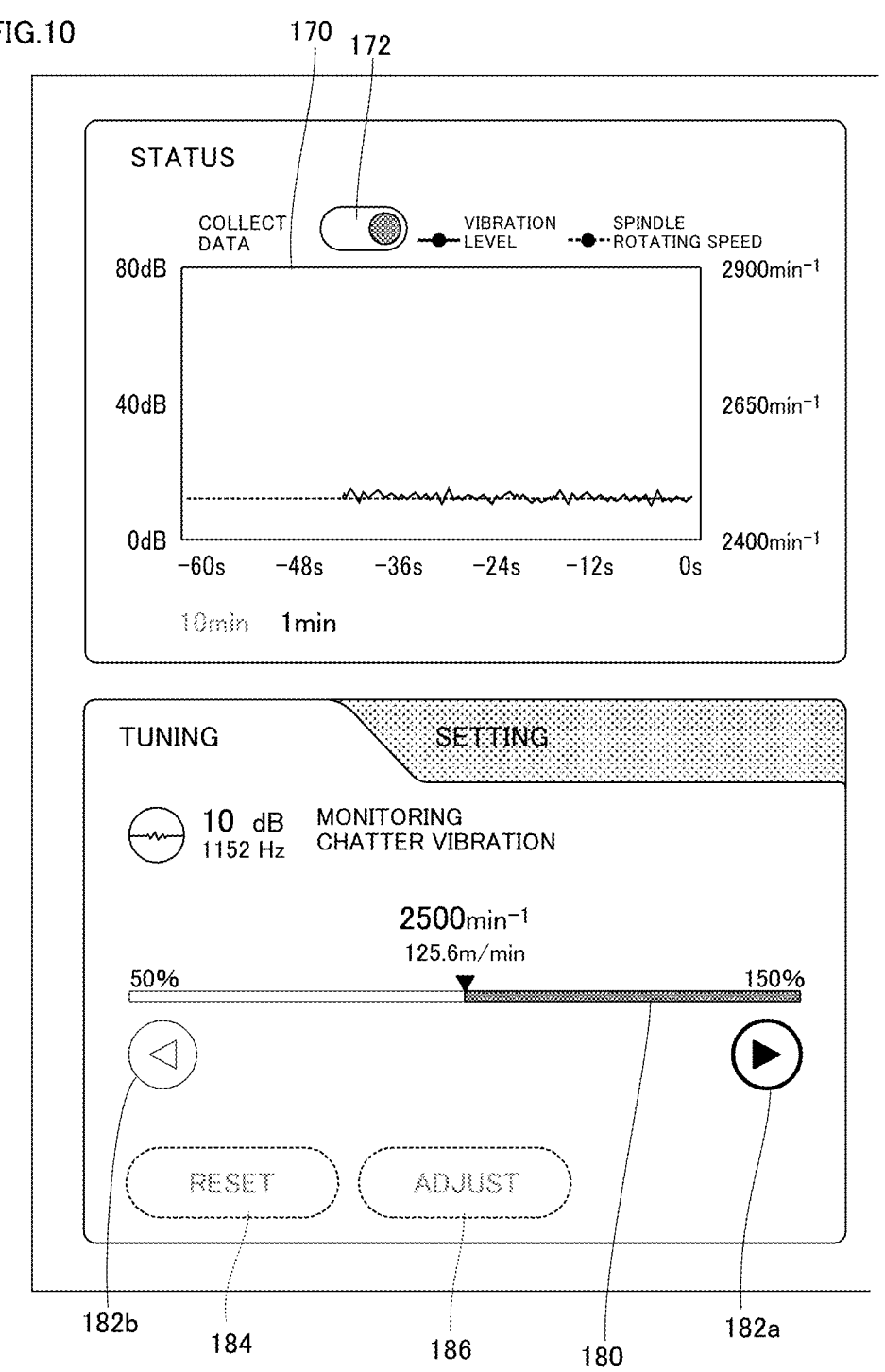
FIG. 10 is a diagram illustrating a tuning screen displayed in the course of respective processes.

The tuning screen is displayed also while no chatter vibration occurs (FIG. 10). Current detection values are displayed as a vibration level and a peak frequency, and a current control-command spindle rotating speed is displayed at a position corresponding to a ratio of that control-command spindle rotating speed to a program-command spindle rotating speed in the override bar 180. A recommended rotating speed is not displayed because a spindle rotating speed is not required to be changed. The adjust button 186 is disabled. The reset button 184 is also disabled. Meanwhile, the select button 182a or 182b is enabled. The enabled select button can be changed from the current setting. In the example in FIG. 10, the first recommendation value higher than the current control-command spindle rotating speed is set to be selectable as presetting. However, by turning on the select button 182b, the selectable recommendation value can be changed to the second recommendation value lower than the current control-command spindle rotating speed.

When a vibration level exceeds a threshold and the chatter detection unit 160 detects chatter vibration (Y at S14), the recommended-rotating-speed calculation unit 156 calculates a recommended rotating speed (S16). A recommendation-value presentation process is then performed (S18).

Figure 11:
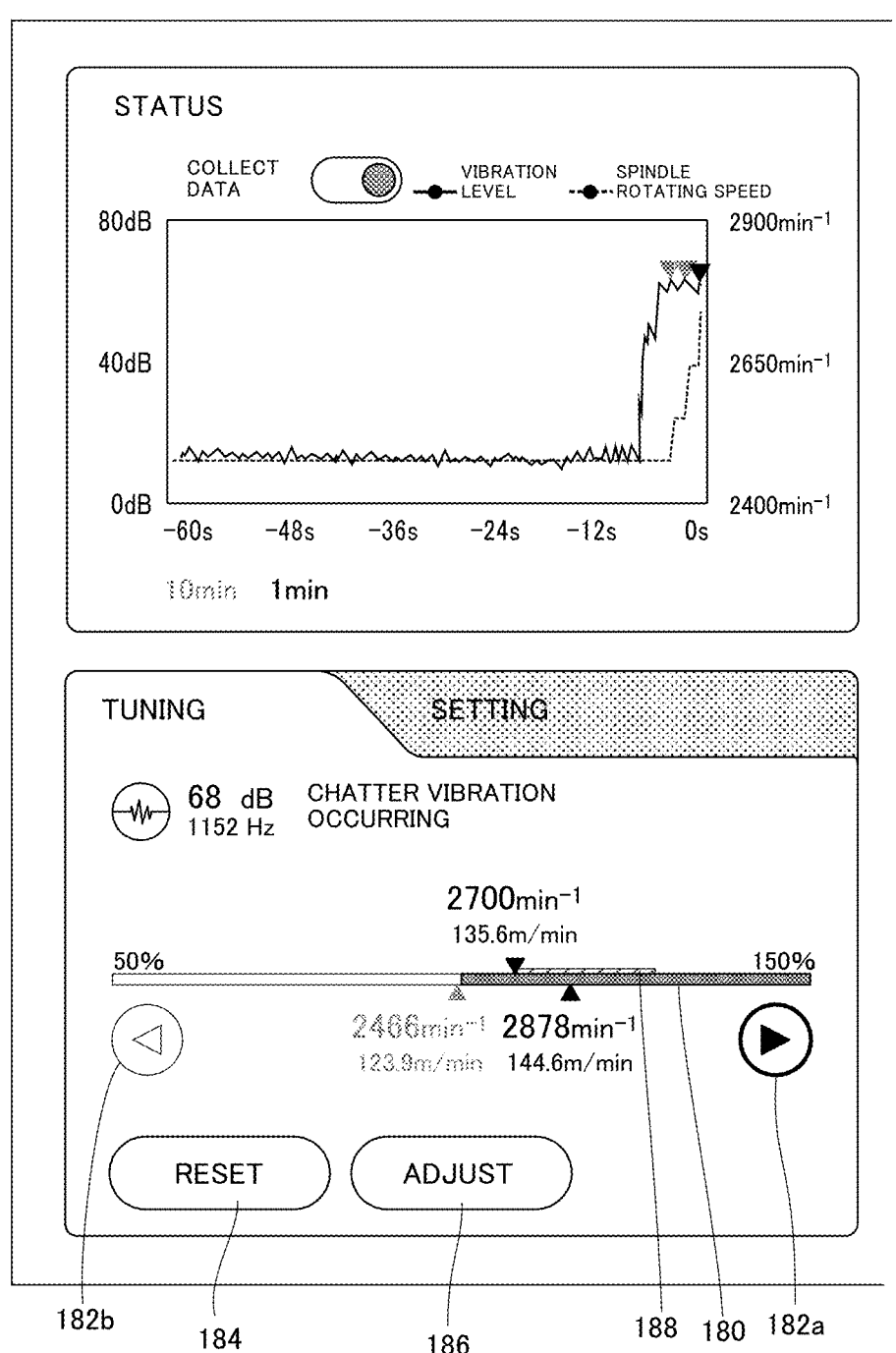
FIG. 11 is a diagram illustrating a tuning screen displayed in the course of respective processes.

As illustrated in FIG. 8, in the recommendation-value presentation process, when both the first and second recommendation values that have been calculated are within an adjustable range (within ±50% of the program-command spindle rotating speed in the present embodiment) (Y at S30), the display control unit 158 causes both the recommendation values to be displayed (S32) (FIG. 11). However, a recommendation value that has not been selected by presetting is grayed out. Further, the adjust button 186 is enabled (S34). In this case, by tapping of the adjust button 186 by the operator, the control-command spindle rotating speed is changed to the first recommendation value.

A re-search range 188 is displayed to be superimposed on the override bar 180. The re-search range 188 indicates a search range for re-calculation of a recommendation value when chatter vibration has not been caused to converge by this change to the recommended rotating speed. This search range is calculated together with the recommendation value depending on a chatter state. In FIG. 11, symbol ▼ in the status screen indicates a timing of switching of the control-command spindle rotating speed. This example illustrates that chatter vibration has not converged although the control-command spindle rotating speed has been switched three times by re-calculation, and therefore the fourth recommendation value has been presented.

Figure 12:
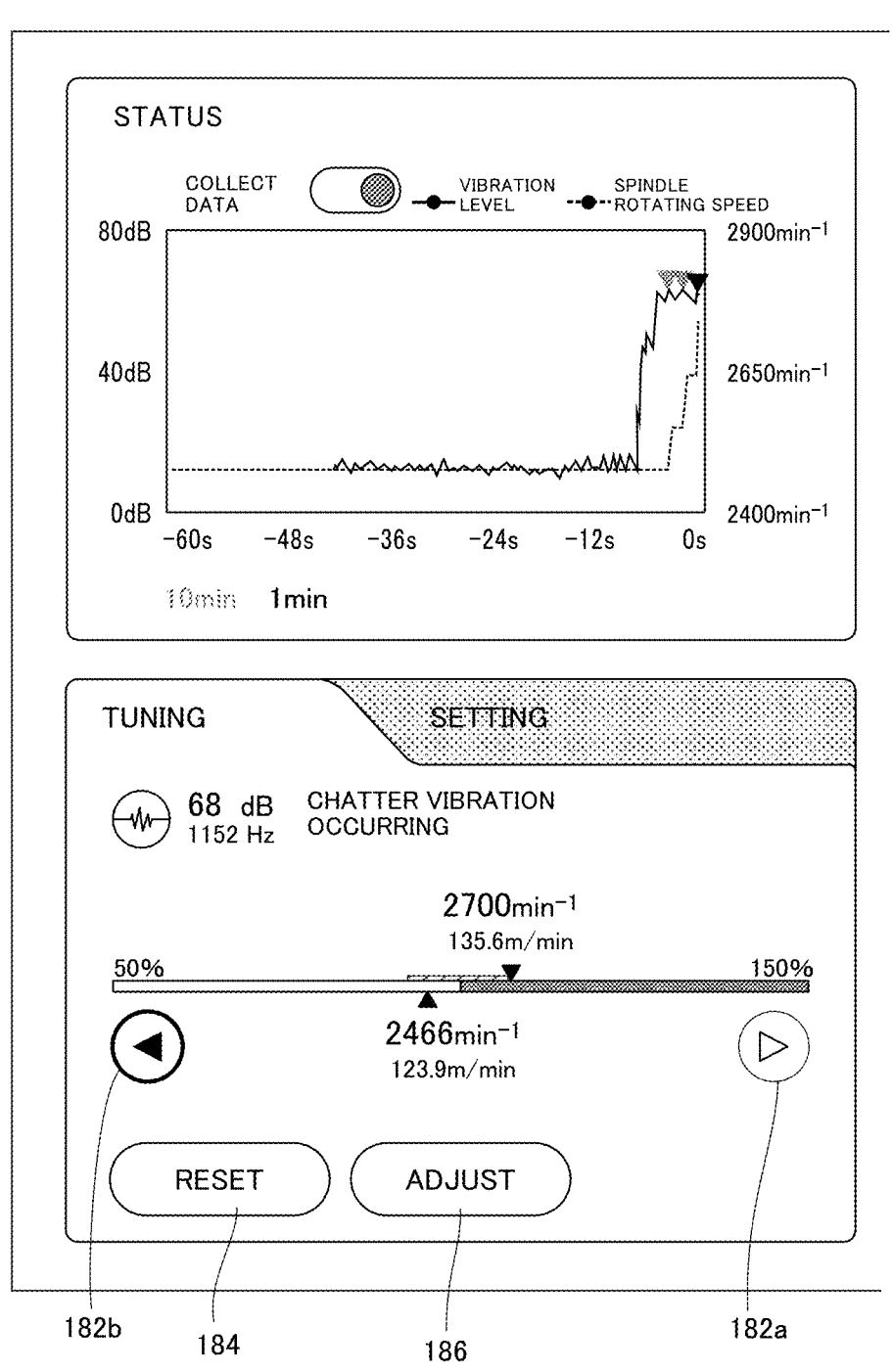
FIG. 12 is a diagram illustrating a tuning screen displayed in the course of respective processes.

Meanwhile, when only the selected one of the recommendation values (a selected recommendation value) is within the adjustable range (N at S30 and Y at S36), the display control unit 158 causes only the selected recommendation value to be displayed (S38) and enables the adjust button 186 (S40) (FIG. 12). In the example in FIG. 12, since the second recommendation value lower than the current control-command spindle rotating speed is selectable, the control-command spindle rotating speed is changed to the second recommendation value by tapping of the adjust button 186 by the operator.

Figure 13:
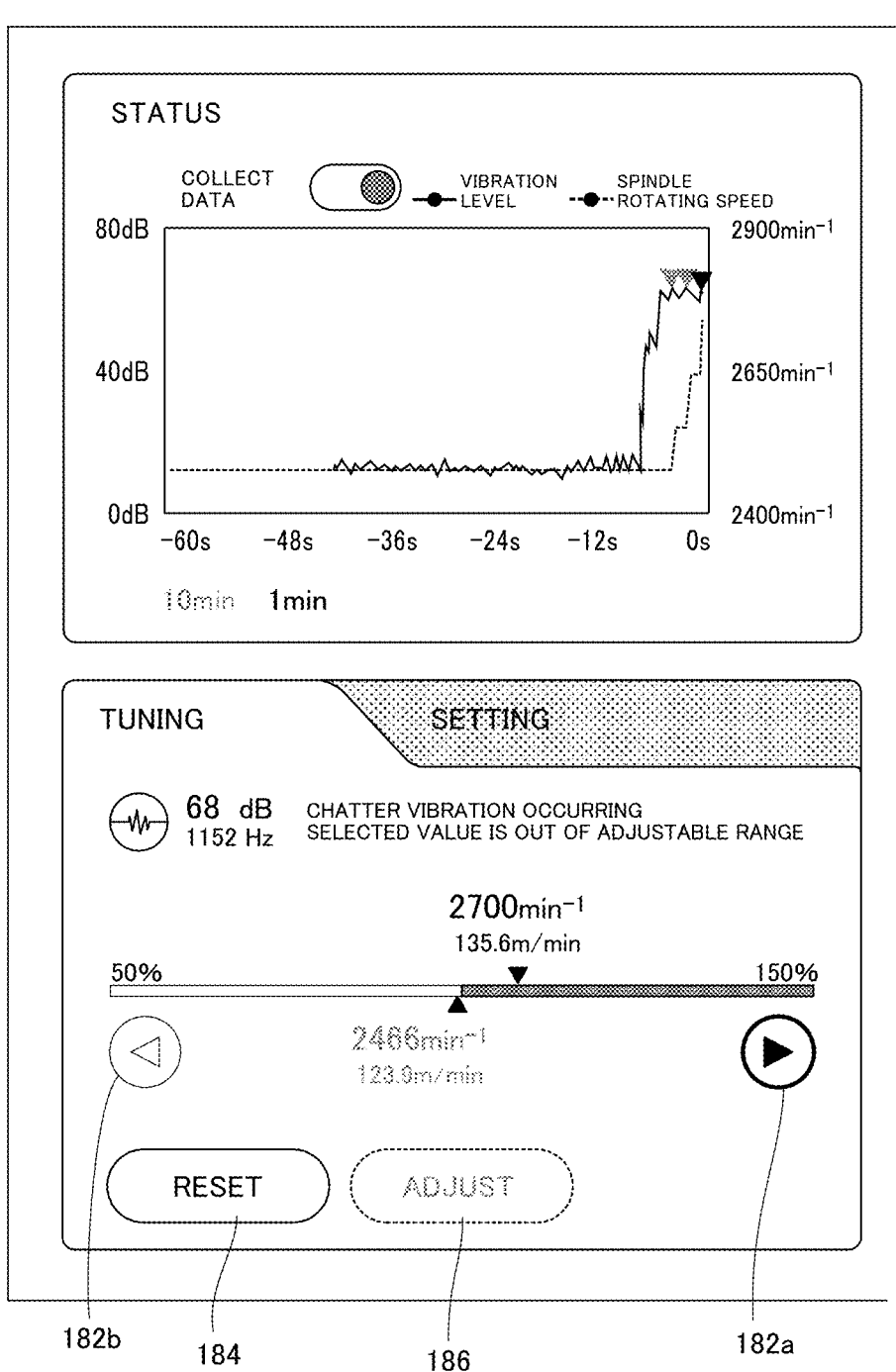
FIG. 13 is a diagram illustrating a tuning screen displayed in the course of respective processes.

When only a non-selected one of the recommendation values (a non-selected recommendation value) is within the adjustable range (N at S36 and Y at S42), the display control unit 158 causes only the non-selected recommendation value to be displayed (S44), but disables the adjust button 186 (S46) (FIG. 13). That is, the operator cannot change the spindle rotating speed in this state. In the example in FIG. 13, the first recommendation value is set to be selectable. Therefore, in order to enable the spindle rotating speed to be changed, it is necessary to turn on the select button 182b, thereby setting the second recommendation value to be selectable.

Figure 14:
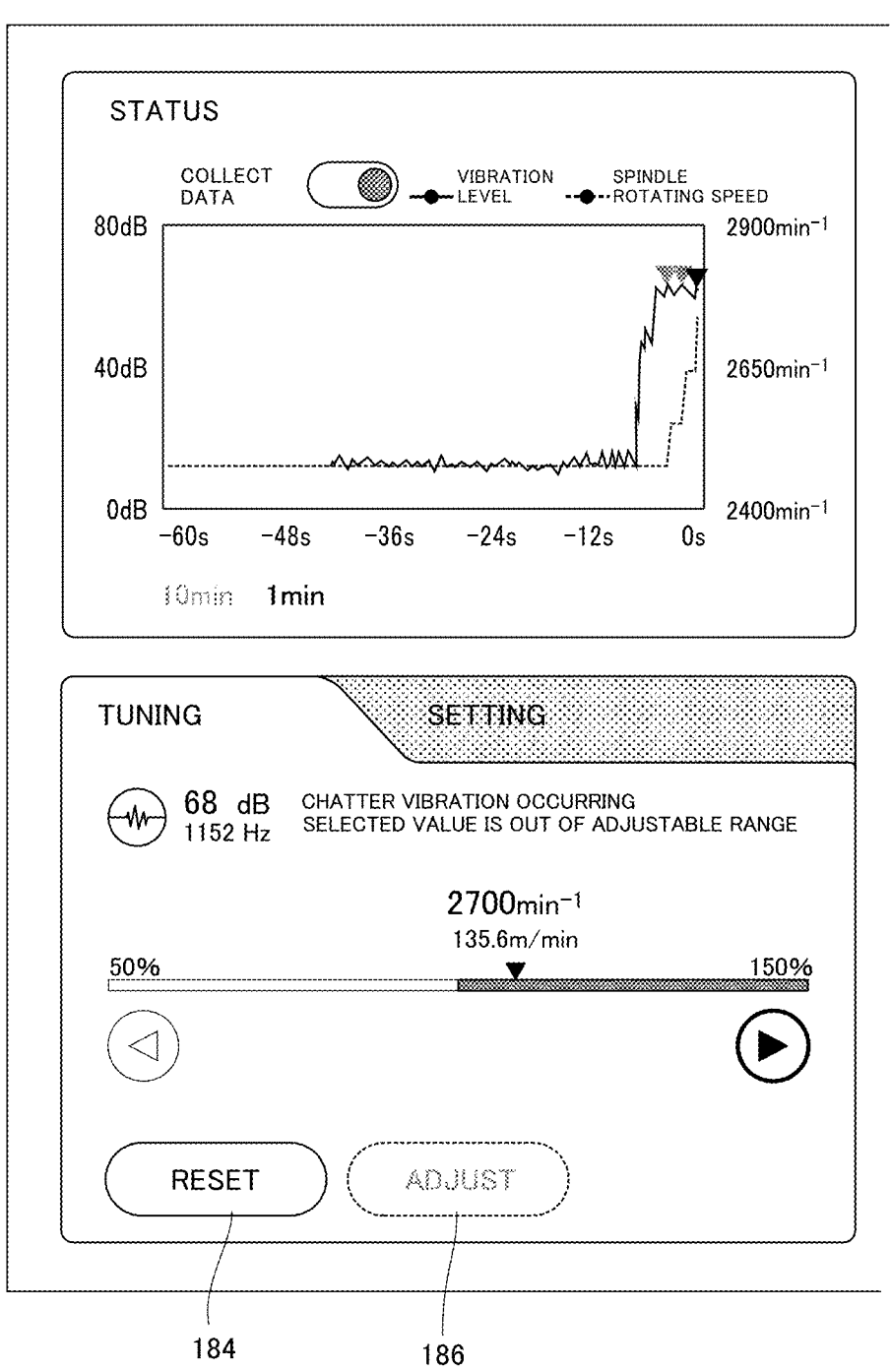
FIG. 14 is a diagram illustrating a tuning screen displayed in the course of respective processes.

When both the first and second recommendation values are not within the adjustable range (N at S42), the display control unit 158 hides both the recommendation values (S48) and disables the adjust button 186 (S50) (FIG. 14). The display control unit 158 also causes a character string indicating this fact, for example, "recommendation values are out of adjustable range" to be displayed. The operator cannot change the spindle rotating speed in this state.

Returning to FIG. 7, when the adjust button 186 is tapped by an input of an operation by the operator (Y at S20), the spindle-rotating-speed adjustment process is performed (S22).

Figure 15:
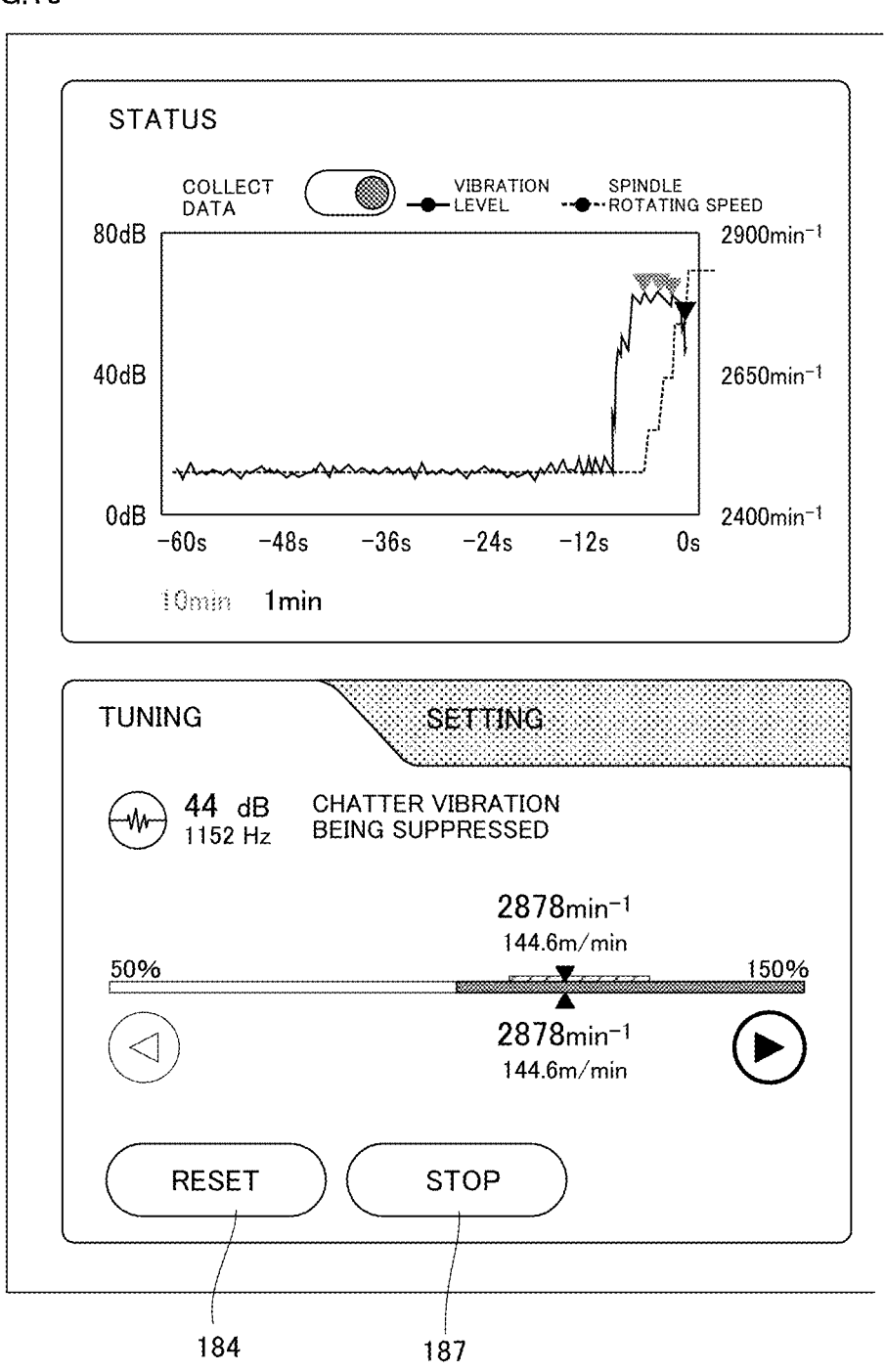
FIG. 15 is a diagram illustrating a tuning screen displayed in the course of respective processes.

As illustrated in FIG. 9, in the spindle-rotating-speed adjustment process, the display control unit 158 causes a stop button 187 to be displayed in place of the adjust button 186 (S60) (FIG. 15). Meanwhile, the vibration processing unit 154 outputs an instruction to change to the selected recommended rotating speed (S62). The numerical control unit 150 changes the control-command spindle rotating speed to that recommended rotating speed and controls the spindle 18. The display control unit 158 updates the status screen and the tuning screen (S63). At this time, symbol ▼ indicating a timing of switching of the control-command spindle rotating speed is added on the status screen, and the display position of the control-command spindle rotating speed is updated on the tuning screen. When feeling an abnormality in the course of switching the control, the operator can stop the control at any time by tapping the stop button 187. Further, the reset button 184 is enabled, so that the operator can reset the control at any time. The reset button 184 is enabled when the program-command spindle rotating speed and the control-command spindle rotating speed are different from each other.

The vibration processing unit 154 acquires data of vibration of the spindle 18 via the detection unit 116 (S64). At this time, when a predetermined end condition has not been satisfied (N at S66), the recommended-rotating-speed calculation unit 156 recalculates the recommended rotating speed (S68). Examples of the "end condition" set in the present embodiment are that the stop button 187 has been tapped, chatter vibration has converged, chatter vibration has become larger than before adjustment, the type of chatter vibration has been changed, and the frequency of chatter vibration has been changed. In the modification, not all these conditions but any of them may be set as the end condition. The display control unit 158 leaves the stop button 187 displayed during this re-calculation (FIG. 16).

Figure 16:
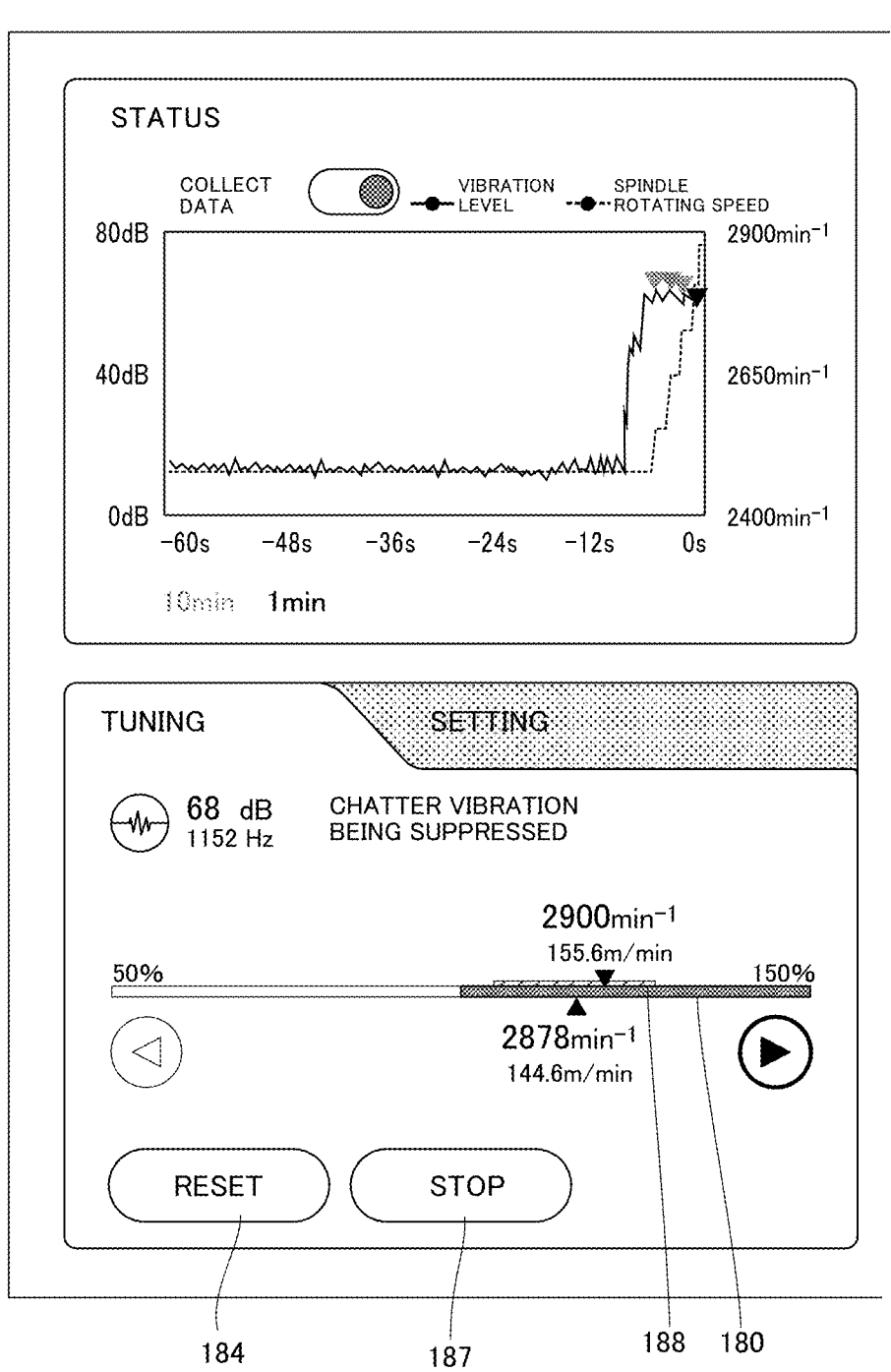
FIG. 16 is a diagram illustrating a tuning screen displayed in the course of respective processes.
Figure 17:
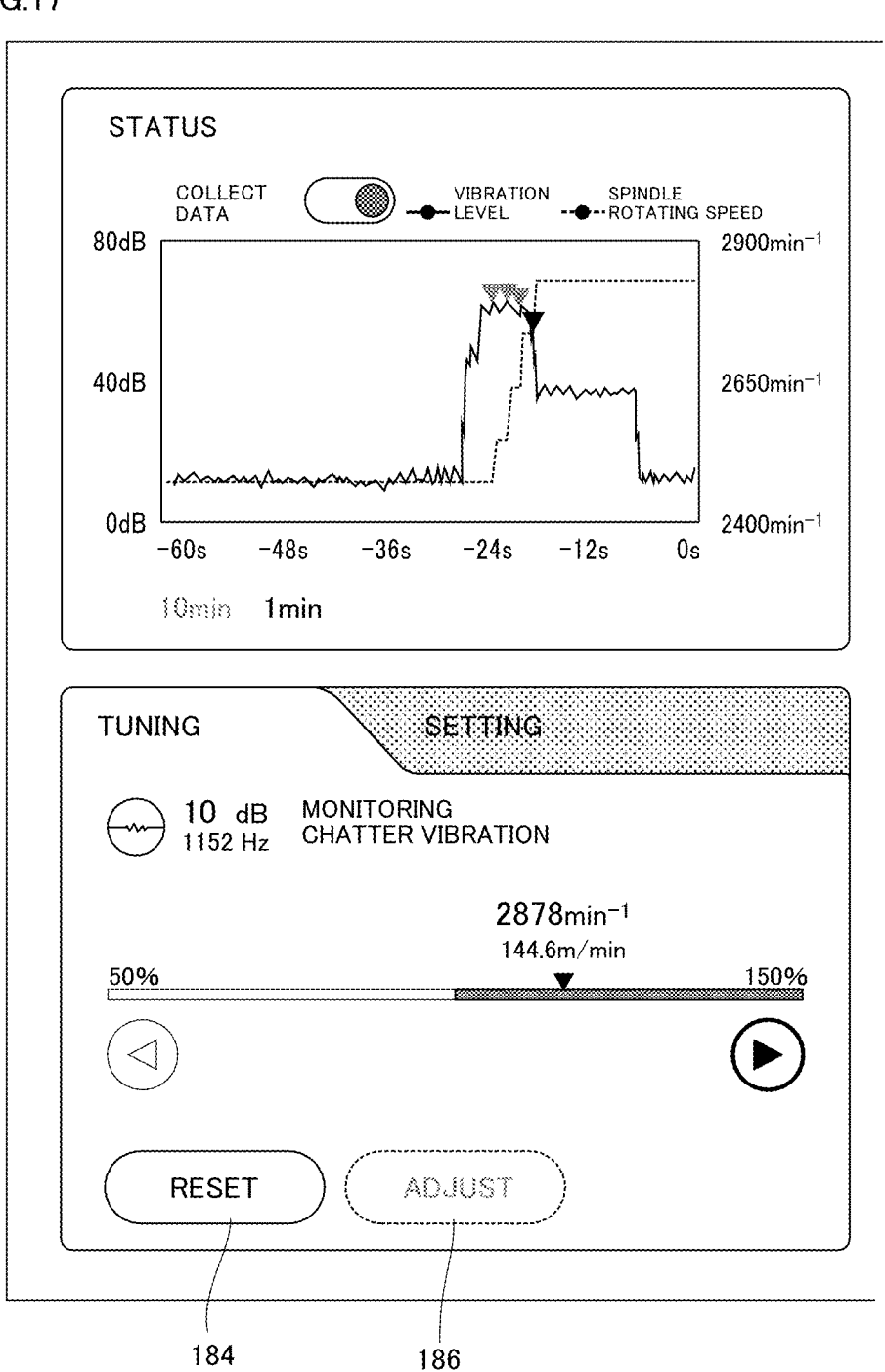
FIG. 17 is a diagram illustrating a tuning screen displayed in the course of respective processes.

In the example in FIG. 16, chatter vibration has occurred at a control-command spindle rotating speed of 2700 min⁻¹, and the operator has tapped the adjust button 186 because 2878 min⁻¹ has been displayed as a recommendation value. The control-command spindle rotating speed has thus been changed to 2878 min⁻¹. However, since the end condition described above has not been satisfied, re-search has been continued. As a result of the re-search, the control-command spindle rotating speed has been automatically changed to 2900 min⁻¹. FIG. 16 illustrates a screen at the moment of this change to 2900 min⁻¹.

At this time, the recommendation value displayed below the override bar 180 has not been changed from 2878 min⁻¹ to 2900 min⁻¹. This is because a cycle from the research to the automatic change of the control-command spindle rotating speed happens in a moment and therefore the operator cannot follow this cycle with eyes. Here, by displaying the re-search range 188 instead of updating and displaying the recommendation value, the operator is made to ascertain up to which range continuous adjustment is performed.

When the calculated recommendation value is within an adjustable range (Y at S70), the process returns to S62. When the end condition is then satisfied (Y at S66), the processes at S68 and S70 are skipped. The display control unit 158 hides the recommendation value (S72) and disables the adjust button 186 by graying out it (S74). Also when the calculated recommendation value is not within the adjustable range (N at S70), the display control unit 158 hides the recommendation value (S72), and grays out the adjust button 186 to disable it (S74).

Returning to FIG. 7, when the adjust button 186 is not tapped (N at S20), the process at S22 is skipped. When no chatter vibration is detected (N at S14), the processes at S16 to S22 are skipped. Thereafter, when a system is shut down, for example, the operation of the machine tool 1 is stopped (Y at S24), a series of processes are ended. When the system is not shut down (N at S24), the process returns to S10.

Figure 18:
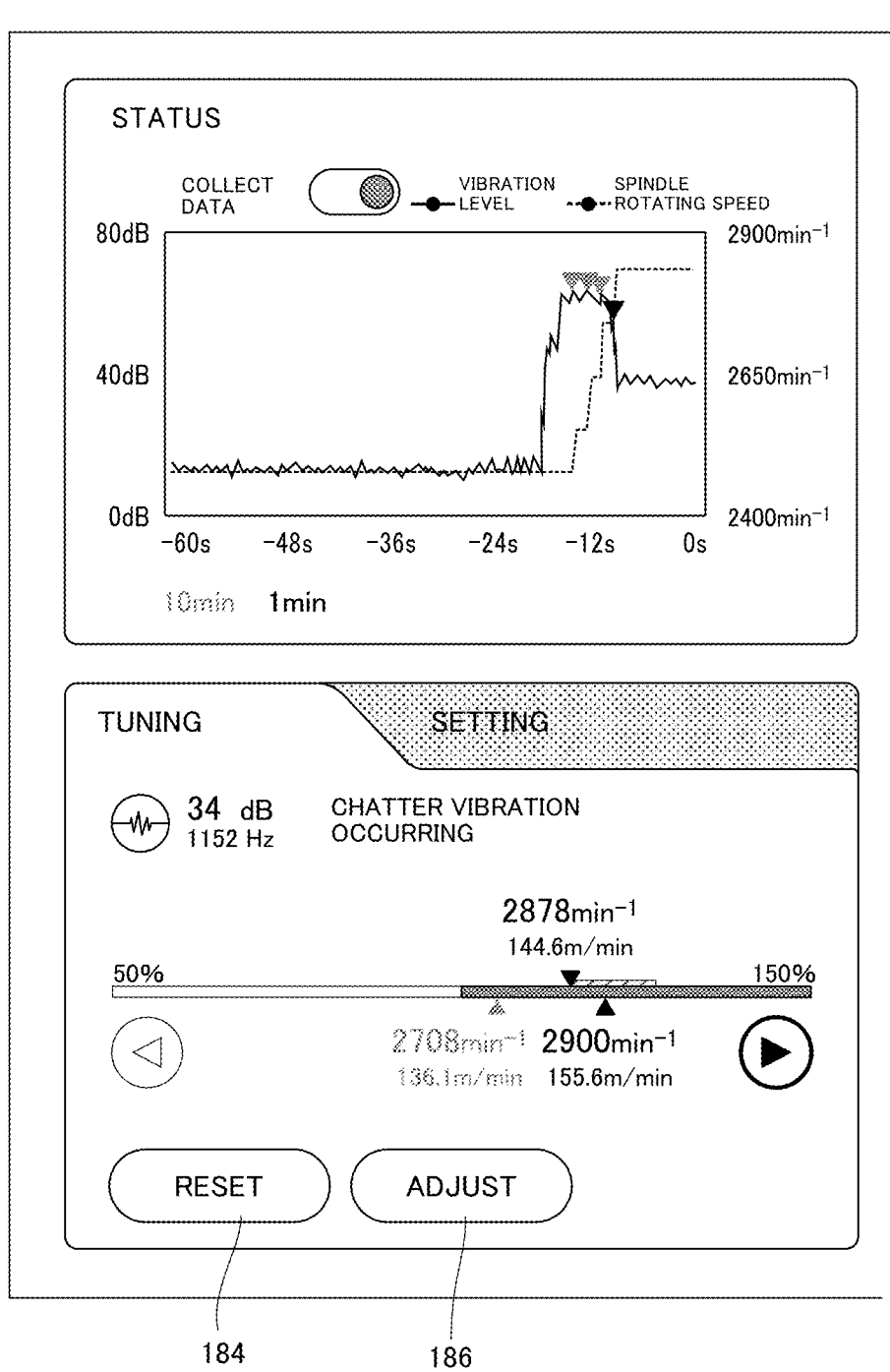
FIG. 18 is a diagram illustrating a tuning screen displayed in the course of respective processes.

When the adjustment has been ended due to a reason other than convergence of chatter vibration in the course of this process, a new recommendation value is presented (FIG. 18). At this time, the adjust button 186 and the reset button 184 are enabled. In the example in FIG. 18, chatter vibration has occurred at a control-command spindle rotating speed of 2700 min⁻¹, and the operator has tapped the adjust button 186 because 2878 min⁻¹ has been displayed as a recommendation value. The control-command spindle rotating speed has thus been changed to 2878 min⁻¹. At this time, the end condition described above has been satisfied although chatter vibration has not converged. Therefore, the adjustment has been ended. New recommendation values (2708 min⁻¹ and 2900 min⁻¹) have been presented below the override bar 180 as a result of recommendation value re-calculation.

The machine tool 1 has been described above on the basis of the embodiment.

According to the present embodiment, a display method has been employed which displays an override bar extending to the left and right on a tuning screen and plots a recommended change value (a recommended rotating speed) of a spindle rotating speed at a position indicated by a ratio in the override bar. An operator can thus ascertain the following items visually (intuitively) and make selection fitting to one's own sense.

A change amount when a control-command spindle rotating speed is adjusted to the recommended rotating speed (a chatter avoidance speed)

A magnitude relation between the control-command spindle rotating speed and the recommended rotating speed In addition, the recommendation value (the recommended rotating speed) is internally calculated, and the operator has only to determine whether to approve the recommendation. Therefore, the operator can easily take a quick response. The present embodiment can provide an easy-to-use display screen for the operator when an operation for suppressing chatter vibration in the machine tool 1 is prompted.

Further, by fixing a 100% position in the override bar, that is, a position of a program-command spindle rotating speed at the center, the operator can continue to ascertain the relation between the control-command spindle rotating speed, the program-command spindle rotating speed, and the recommended rotating speed even when adjustment of the spindle rotating speed is repeated. At this time, it is also unnecessary for the operator to numerically recognize the program-command spindle rotating speed.

An operator of a machine tool is often used to an operation of changing a spindle rotating speed or a feed rate by a ratio of the spindle rotating speed or the feed rate to a current control command value by using a so-called override switch. According to the present embodiment, display is performed in such a manner that the recommended rotating speed can be intuitively ascertained as a ratio of the recommended rotating speed to the program-command spindle rotating speed in the override bar, thus realizing sense of use that does not give discomfort to such an operator. As a result, the operator can adjust the spindle rotating speed more quickly.

Furthermore, by presenting an adjustable range of the spindle rotating speed in the override bar, the operator can visually determine whether adjustment to the calculated recommended rotating speed is possible. By plotting a numerical value on the override bar and presenting the adjustable range, the change can be avoided from proceeding toward a direction that is not intended by the operator quantitatively and qualitatively.

<Modification>

FIGS. 19A and 19B are diagrams each illustrating a main part of a tuning screen according to a modification.

In the above-described embodiment, an example has been described in which an adjustable range of a spindle rotating speed is set to a range from 50% to 150% (that is, within ±50%) of a program-command spindle rotating speed as illustrated in FIG. 19A. In the present modification, setting of the adjustable range can be changed by determination by an operator.

That is, the adjustable range can be set to a range from 50% to 150% (that is, within ±50%) (FIG. 19A) or a range from 80% to 120% (that is, within ±20%) (FIG. 19B). Further, it is also allowable that the adjustable ratio (%) on the plus side and the adjustable ratio (%) on the minus side can be made to be different from each other with respect to the control-command spindle rotating speed. Appropriate setting, for example, in which the adjustable range on the minus side that is a relatively safe side is set to be larger can be performed. These settings can be performed by switching the tuning screen to a setting screen. Such setting allows an upper limit and a lower limit of the adjustable range to be set by determination by the operator, thus enabling an operation fitting to the sense of each operator.

In the above-described embodiment, an example has been described in which a current control-command spindle rotating speed is displayed above the override bar 180. In the modification, an actual spindle rotating speed may be displayed in place of the current control-command spindle rotating speed. This is because the current control-command spindle rotating speed is approximately equal to the actual spindle rotating speed. In this case, the "actual spindle rotating speed" corresponds to the "second rotating speed". The recommended-rotating-speed calculation unit 156 calculates the first recommendation value higher than the actual spindle rotating speed and the second recommendation value lower than the actual spindle rotating speed as recommended rotating speeds to be presented to the operator.

In the above-described embodiment, a horizontal machining center has been described as an example of the machine tool 1. The machine tool 1 may be a vertical machining center in the modification. Alternatively, the machine tool 1 may be a turning center or a combined machine having both the functions of the machining center and the turning center. The above-described display control for suppressing chatter vibration may be applied to these machine tools.

The present invention is not limited to the embodiments described above and modifications thereof, and any component thereof can be modified and embodied without departing from the scope of the invention. Components described in the embodiments and modifications can be combined as appropriate to form various embodiments. Some components may be omitted from the components presented in the embodiments and modifications.

This application claims priority from Japanese Patent Application No. 2021-106227 filed on Jun. 28, 2021, the entire contents of which are hereby incorporated by reference herein.

The invention claimed is:

1. A display control device comprising:
   a processor controlling display of an operating state of a machine tool including (i) an attachment portion to which a tool is attachable, (ii) a numerical controller controlling rotation of the tool in accordance with a machining program and (iii) a vibration sensor detecting vibration of the tool; and
   a memory storing various programs including the machining program and set data,
   wherein the processor calculates a first rotating speed on a basis of a vibration level detected by the vibration sensor when the vibration level has exceeded a predetermined value;
   receives a change instruction for changing a second rotating speed to the first rotating speed, the second rotating speed being a rotating speed when the vibration level has exceeded the predetermined value; and
   (i) performs control to display, on an operation screen, the first rotating speed, the second rotating speed, and a ratio display indicating, along a scale, a change ratio of a rotating speed to a third rotating speed specified by the machining program, the third rotating speed being a program-command spindle rotating speed represented as 100% on the scale, and (ii) performs control to display the first rotating speed at a position in the ratio display corresponding to a change ratio of the first rotating speed to the third rotating speed, wherein when the processor has received the change instruction, the numerical controller performs control to change a control command value of a rotating speed of the tool to the first rotating speed.

2. A machine tool comprising:

a processor controlling display of an operating state of the machine tool:

a memory storing various programs including the machining program and set data;

an attachment portion to which a tool is attachable;

a numerical controller controlling rotation of the tool in accordance with a machining program; and a vibration sensor detecting vibration of the tool, wherein the processor calculates a first rotating speed on a basis of a vibration level detected by the vibration sensor when the vibration level has exceeded a predetermined value;

receives a change instruction for changing a second rotating speed to the first rotating speed, the second rotating speed being a rotating speed when the vibration level has exceeded the predetermined value; and performs control to display, on an operation screen, the first rotating speed, the second rotating speed, and a ratio display indicating, along a scale, a change ratio of a rotating speed to a third rotating speed specified by the machining program, the third rotating speed being a program-command spindle rotating speed represented as 100% on the scale, and performing control to display the first rotating speed at a position in the ratio display corresponding to a change ratio of the first rotating speed to the third rotating speed, wherein when the processor has received the change instruction, the numerical controller performs control to change a control command value of a rotating speed of the tool to the first rotating speed.

3. The machine tool according to claim 2, wherein when the vibration level detected by the vibration sensor has exceeded the predetermined value, the processor enables an adjust button displayed on the operation screen to receive a change instruction to change the second rotating speed to the first rotating speed, and when an input is performed on the enabled adjust button, the processor receives the change instruction.

4. The machine tool according to claim 3, wherein the processor calculates, as the first rotating speed, a first recommendation value higher than the second rotating speed and a second recommendation value lower than the second rotating speed, and before enabling the adjust button, the processor displays a setting screen for receiving a setting instruction indicating which of the first recommendation value and the second recommendation value is to be selected.

\* \* \* \* \*